(12) United States Patent
Li et al.

(10) Patent No.: US 10,139,426 B2
(45) Date of Patent: Nov. 27, 2018

(54) AIRFLOW TEST METHOD, AIRFLOW TEST APPARATUS AND CLEAN ROOM CONTROL SYSTEM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qian Li, Beijing (CN); Xiaolei Wang, Beijing (CN); Daowu Huang, Beijing (CN); Sheng Du, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 594 days.

(21) Appl. No.: 14/803,890

(22) Filed: Jul. 20, 2015

(65) Prior Publication Data

US 2016/0161523 A1 Jun. 9, 2016

(30) Foreign Application Priority Data

Dec. 3, 2014 (CN) .......................... 2014 1 0727214

(51) Int. Cl.
| | | |
|---|---|---|
| *G01P 5/02* | (2006.01) | |
| *G01P 13/00* | (2006.01) | |
| *G01N 15/06* | (2006.01) | |
| *G01P 13/04* | (2006.01) | |
| *G01P 5/00* | (2006.01) | |

(52) U.S. Cl.
CPC ............ *G01P 13/045* (2013.01); *G01P 5/001* (2013.01)

(58) Field of Classification Search
None
See application file for complete search history.

(56) References Cited

U.S. PATENT DOCUMENTS 9,057,709 B2 * 6/2015 Li ............................. G01P 5/10
2009/0243918 A1 * 10/2009 Kelly ....................... G01S 7/04
342/26 R

FOREIGN PATENT DOCUMENTS

| CN | 101692097 A | 4/2010 |
|---|---|---|
| CN | 101813709 A | 8/2010 |

(Continued)

OTHER PUBLICATIONS

First OA dated Sep. 6, 2016 for corresponding CN 201410727214.9, with English machine translation.

*Primary Examiner* — Daniel S Larkin
(74) *Attorney, Agent, or Firm* — Nath, Goldberg & Meyer; Joshua B. Goldberg

(57) ABSTRACT

The present invention provides an airflow test method comprising: setting a plurality of test points within a test space; detecting the respective one-dimensional velocities of the airflow at each test point along a plurality of test directions, said plurality of test directions including at least three directions; calculating the actual direction and the actual velocity of the airflow at each test point based on the respective one-dimensional velocities of the airflow at the test point along the plurality of test directions. Also, the present invention provides an airflow test apparatus and a clean room control system. The present invention enables detecting the distribution of airflow in the test space with simple method.

10 Claims, 5 Drawing Sheets

(56) References Cited

FOREIGN PATENT DOCUMENTS

| | | | |
|---|---|---|---|
| CN | 102288777 | A | 12/2011 |
| CN | 102928617 | A | 2/2013 |
| CN | 104049105 | A | 9/2014 |
| JP | 2001-099462 | * | 4/2001 |
| KR | 20100023062 | A | 3/2010 |

* cited by examiner

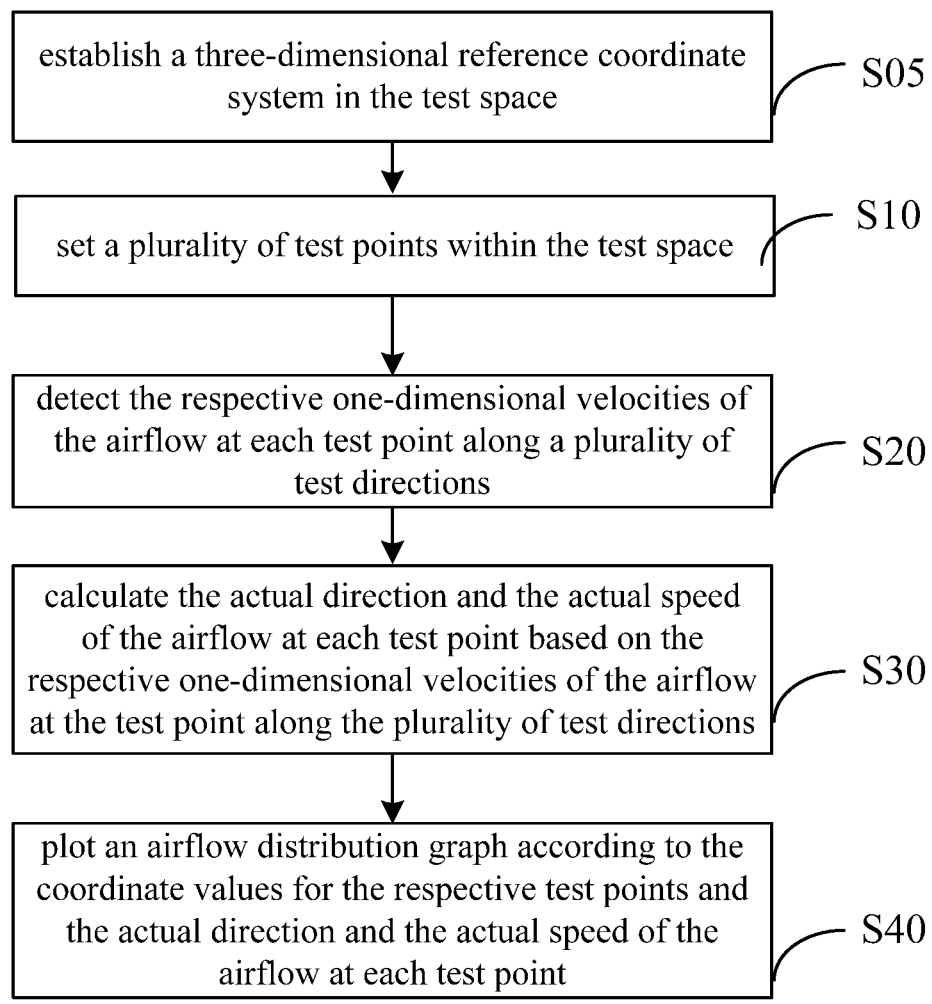
Fig. 1-a

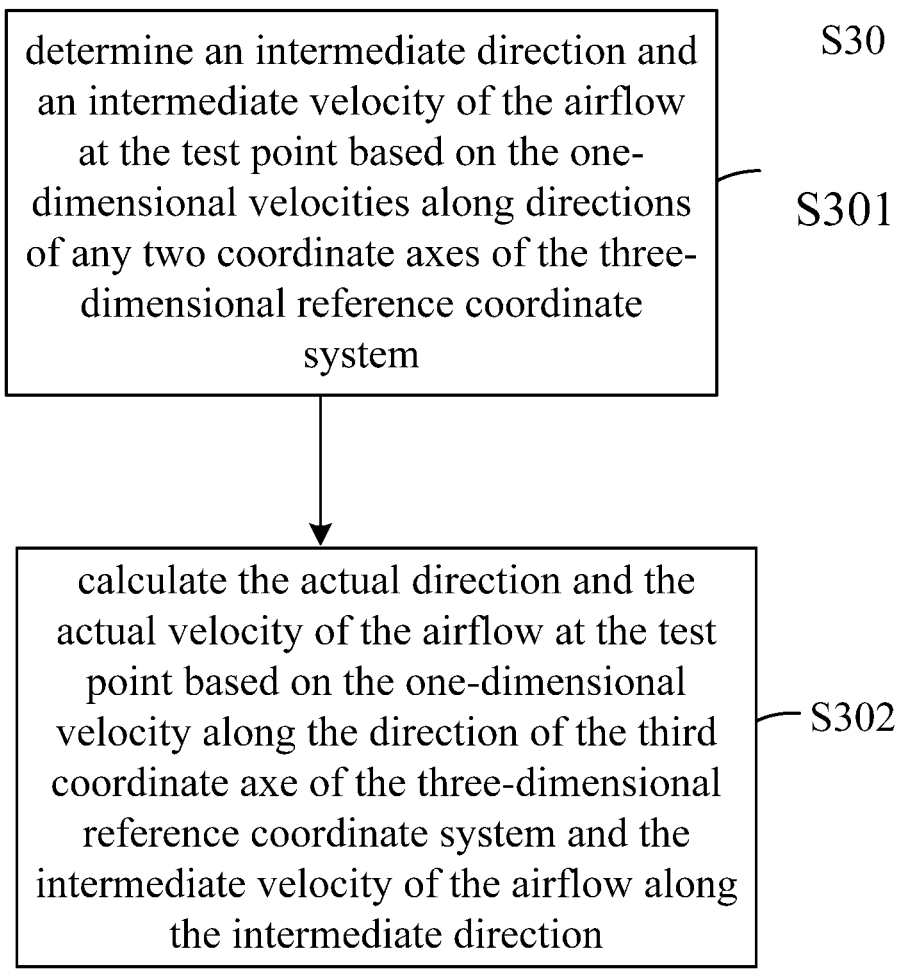
Fig. 1-b

AIRFLOW TEST METHOD, AIRFLOW TEST APPARATUS AND CLEAN ROOM CONTROL SYSTEM

FIELD OF THE INVENTION

The present invention relates to manufacturing technology of display devices, and particularly to an airflow test method, an airflow test apparatus and a clean room control system comprising the airflow test apparatus.

BACKGROUND OF THE INVENTION

In the production process of the display device, the impurity particles have great impact on the product quality, thus a cleanliness reaching certain standard becomes very important to the quality of products. In order to ensure the cleanliness of the clean room and inside the device, it is necessary to detect the distribution of airflow.

In the existing test device and method for visualizing the airflow organization, sample gas having temperature difference with the environmental gas is introduced into the test space, thereby forming a sample airflow in the test space, then the spatial position of sample gas can be detected successively using a thermal imaging device.

The shortcoming of the above method is that, the test apparatus itself is complicated, and the sample gas introduced into the test space has an impact on the temperature and humidity within the test space.

SUMMARY OF THE INVENTION

The object of the present invention is to provide an airflow test method which can be easily used and an airflow test apparatus having a simple configuration so that the temperature and humidity within the test space may not be affected.

An embodiment of the present invention provides an airflow test method, comprising steps of:

setting a plurality of test points within the test space;

detecting the respective one-dimensional velocities of the airflow at each test point along a plurality of test directions, said plurality of test directions including at least three directions; and calculating the actual direction and the actual velocity of the airflow at each test point based on the respective one-dimensional velocities of the airflow at the test point along the plurality of test directions.

Preferably, before the step of setting the plurality of test points within the test space, the method further comprises:

establishing a three-dimensional reference coordinate system in the test space; wherein the plurality of test directions include the directions of coordinate axes of the three-dimensional reference coordinate system.

Preferably, the step of calculating the actual direction and the actual velocity of the airflow at each test point based on the respective one-dimensional velocities of the airflow at the test point along the plurality of test directions includes:

determining an intermediate direction and an intermediate velocity of the airflow at the test point based on the one-dimensional velocities along directions of any two coordinate axes of the three-dimensional reference coordinate system; and calculating the actual direction and the actual velocity of the airflow at the test point based on the one-dimensional velocity along the direction of the third coordinate axis of the three-dimensional reference coordinate system and the intermediate velocity of the airflow along the intermediate direction.

Preferably, after the step of calculating the actual direction and the actual velocity of the airflow at each test point based on the respective one-dimensional velocities of the airflow at the test point along the plurality of test directions, the method further comprises:

plotting an airflow distribution graph according to the coordinate values for the respective test points and the actual direction and the actual velocity of the airflow at each test point.

Preferably, the airflow distribution graph includes:

a two-dimensional distribution graph including projection points of the plurality of test points on a same plane, wherein each projection point is marked by using a two-dimensional graphic mark of various colors, the two-dimensional graphic marks of a same color are used for the test points having the same height the two-dimensional graphic mark corresponds to the actual direction and the actual velocity of the airflow at the test point; and/or a three-dimensional distribution graph including a plurality of test points, wherein each test point is marked by using a three-dimensional graphic mark corresponding to the actual direction and the actual velocity of the airflow.

Accordingly, an embodiment of the present invention also provides an airflow test apparatus, comprising:

a detection module for detecting the respective one-dimensional velocities of the airflow at each test point along a plurality of test directions, said plurality of test directions including at least three directions; and a processing module for calculating the actual direction and the actual velocity of the airflow at each test point based on the respective one-dimensional velocities of the airflow at the test point along the plurality of test directions.

Preferably, the detection module comprises any one of an impeller anemometer, acoustic anemometer or thermal anemometer.

Preferably, the plurality of test directions include the directions of coordinate axes of the three-dimensional reference coordinate system, the processing module comprises:

a storage unit, in which a function for calculating the actual direction and the actual velocity of the airflow at each test point based on the respective one-dimensional velocities of the airflow at the test point along the plurality of test directions is stored in advance; and a computing unit, which utilizes the function to calculate firstly the intermediate direction and the intermediate velocity of the airflow at the test point based on the one-dimensional velocities along directions of any two coordinate axes of the three-dimensional reference coordinate system, and then calculate the actual direction and the actual velocity based on the one-dimensional velocity along the direction of the third coordinate axis of the three-dimensional reference coordinate system and the intermediate velocity of the airflow along the intermediate direction.

Preferably, the detection module is capable of detecting the coordinate values of the test point, and the processing module further comprises a graph generation unit which generates an airflow distribution graph according to the coordinate values for the respective test points and the calculation results of the computing unit.

The airflow test apparatus further comprises a display module for displaying the airflow distribution graph generated by the graph generation unit.

Preferably, the airflow distribution graph includes:

a two-dimensional distribution graph including projection points of the plurality of test points on a same plane, wherein each projection point is marked by using a two-dimensional graphic mark of various colors, the two-dimensional graphic marks of a same color correspond to the actual directions and the actual velocities of the airflow at test points having the same height; and/or a three-dimensional distribution graph including a plurality of test points, wherein each test point is marked by using a three-dimensional graphic mark corresponding to the actual direction and the actual velocity of the airflow.

Accordingly, an embodiment of the present invention also provides a clean room control system comprising the above airflow test apparatus and a dust detection apparatus.

According to the present invention, when testing the airflow distribution, only the one-dimensional velocity of the airflow along each test direction need to be detected, then the actual direction and the actual velocity of the airflow at the test point can be obtained by synthesizing the test directions and the corresponding one-dimensional velocities. Compared to the prior art, the present invention provides a simple test method and a simple structure of the apparatus, thereby the occupied test space is reduced, and the test method of the present invention is applicable to small space within a device. Moreover, the test method of the present invention does not require the test gas introduced into the test space, thereby the impact on the temperature and humidity within the test space can be reduced, and the dust detection apparatus can further determine whether dusts exist in the test space accurately.

BRIEF DESCRIPTION OF THE DRAWINGS

The accompanying drawings, which constitute a part of the description, are used for providing further understanding of the present invention and interpreting the present invention together with the following specific embodiments, rather than limiting the present invention, in the drawings:

FIG. 1-*a* is a schematic flowchart of the airflow test method according to an embodiment of the present invention;

FIG. 1-*b* is a schematic flowchart of step 30 in the airflow test method according to an embodiment of the present invention;

Figure 2:
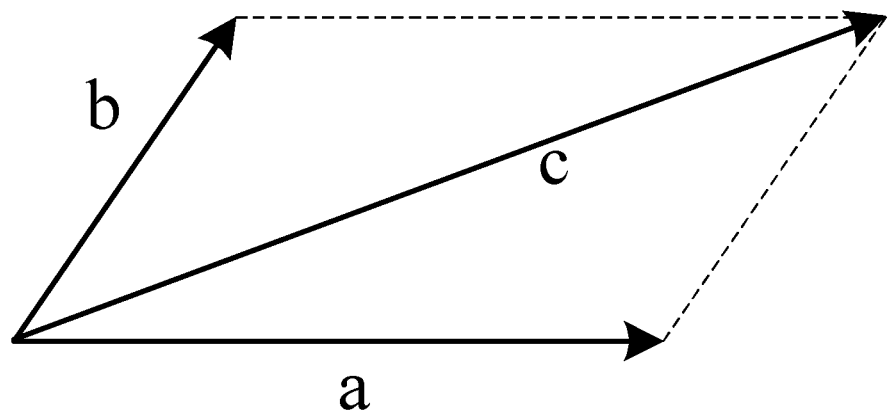
FIG. 2 is a schematic view of determining the actual direction and the actual velocity of the airflow based on two test directions and one-dimensional velocities according to an embodiment of the present invention.

Reference numerals: 10, detection module; 20, processing module; 21, storage unit; 22, computing unit; 23, graph generation unit; and 30, display module.

DETAILED DESCRIPTION OF THE EMBODIMENTS

The specific embodiments of the present invention will be described in detail below in conjunction with the accompanying drawings. It should be understood that, the specific embodiments described herein are merely used for illustrating and interpreting the present invention, rather than limiting the present invention.

As one aspect of the present invention, an airflow test method is provided, as shown in FIG. 1-*a*, the airflow test method comprises:

S10, setting a plurality of test points within the test space;

S20, detecting the respective one-dimensional velocities of the airflow at each test point along a plurality of test directions, said plurality of test directions including at least three directions; and S30, calculating the actual direction and the actual velocity of the airflow at each test point based on the respective one-dimensional velocities of the airflow at the test point along the plurality of test directions.

In the present embodiment, after the positions of the test points are set, the airflow at the test points can be tested. The airflow at the test points is caused by flowing of existing air in the test space, no other test gas is required to be introduced into the test space, thereby the temperature and humidity within the test space is not affected. Once a test direction is determined, the one-dimensional velocity along the test direction can be easily detected using conventional devices, such as an anemometer, and the actual direction and the actual velocity of the airflow can be synthesized from the respective one-dimensional velocities along the plurality of test directions. The test process does not require sophisticated equipment and is easy to use, thus the method is applicable to not only clean rooms but also small spaces inside the device. Quantitative analysis to the airflow can be realized, and the application range thereof is extended.

The actual direction and the actual velocity of the airflow at a test point can be obtained using vector synthesis method.

Specifically, in a plane, the actual velocity of the airflow at a test point along the actual direction can be decomposed in two test directions; to the contrary, when the one-dimensional velocities along two test directions are determined, the actual direction and the actual velocity of the airflow at the test point can be calculated. As shown in FIG. 2, wherein the directions of a, b represent two test directions respectively, the length of a, b represent the value of two one-dimensional velocities, and the direction of c represents the actual direction of the airflow, the length of c represents the value of the actual velocity.

Similar to the case in a plane, while in space, the actual velocity of the airflow at a test point along the actual direction can be decomposed in a plurality of test directions, and the actual direction and the actual velocity can be synthesized from the one-dimensional velocities along the plurality of test directions.

The plurality of test directions is not limited in the embodiments of the present invention, provided that the actual direction and the actual velocity can be calculated based on the plurality of one-dimensional velocities along the plurality of test directions. In order to calculate the actual velocity conveniently, preferably, before the step S10, the test method further comprises:

S05, establishing a three-dimensional reference coordinate system in the test space; wherein the plurality of test directions include the directions of coordinate axes of the three-dimensional reference coordinate system.

FIG. 1-*b* is a schematic flowchart of step 30 in the airflow test method according to an embodiment of the present invention. As shown in FIG. 1-*b*, the step S30 comprises:

S301, determining an intermediate direction and an intermediate velocity of the airflow at the test point based on the one-dimensional velocities along directions of any two coordinate axes of the three-dimensional reference coordinate system; and S302, calculating the actual direction and the actual velocity of the airflow at the test point based on the one-dimensional velocity along the direction of the third coordinate axis of the three-dimensional reference coordinate system and the intermediate velocity of the airflow along the intermediate direction.

The step S30 is directed to convert the vector synthesis in space into the vector synthesis on a plane. For example, the intermediate direction and the intermediate velocity on the xy plane can be synthesized from the one-dimensional velocities along the x-axis and the y-axis, and the actual direction is on the plane defined by the z-axis and the intermediate direction, therefore the actual direction and the actual velocity can be obtained by synthesizing the z-axis-velocity and the intermediate velocity along the intermediate direction.

During an actual calculation, we can write a macro according to the above steps. By recording the test directions and the one-dimensional velocities at each test point in an office software having macro editing function (e.g. Excel, C editor, etc.), batch computing of the actual direction and the actual velocity can be realized by invoking the macro function, enabling a batch processing. As such, according to the airflow test method of the present embodiment, the one-dimensional velocities can be detected using simple test instruments, then the macro function is invoked to complete the test. Manual analysis is not needed, such that the test results are objective.

In order to show clearly the status of the airflow distribution, as shown in FIG. 1-a, after the step S30, the test method further comprises:

S40, plotting an airflow distribution graph according to the coordinate values for the respective test points and the actual direction and the actual velocity of the airflow at each test point.

The airflow distribution graph may have different forms, as long as the position of each test point is determined, and the actual direction and the actual velocity of the airflow are marked at each test point. Specifically, the airflow distribution graph may include:

a two-dimensional distribution graph including projection points of the plurality of test points on a same plane, wherein each projection point is marked by using a two-dimensional graphic mark of various colors, the two-dimensional graphic marks of a same color are used for the test points having the same height, the two-dimensional graphic mark corresponds to the actual direction and the actual velocity of the airflow at the test point; and/or a three-dimensional distribution graph including a plurality of test points, wherein each test point is marked by using a three-dimensional graphic mark corresponding to the actual direction and the actual velocity of the airflow.

Figure 3:
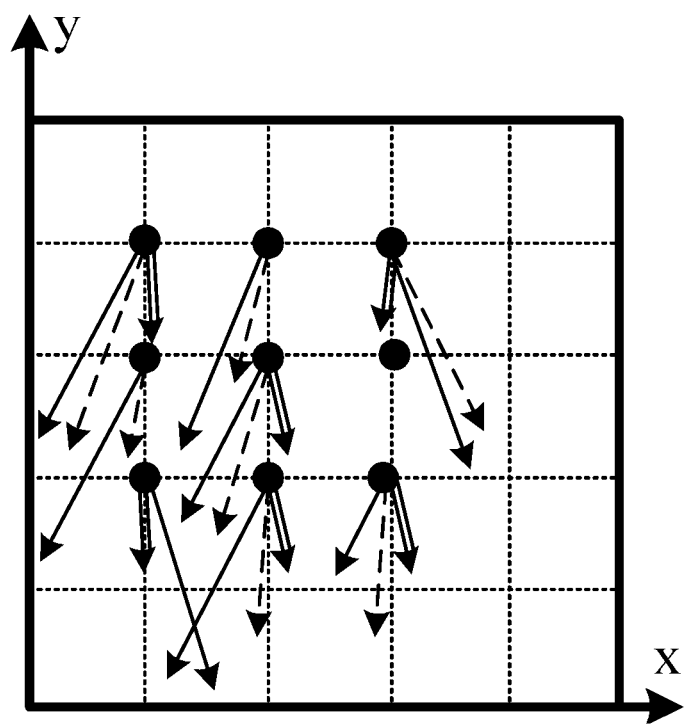
FIG. 3 is a two-dimensional airflow distribution graph according to an embodiment of the present invention.

For example, the test space is provided with twenty-seven test points distributed evenly, and the actual direction and the actual velocity at each test point is calculated. As shown in FIG. 3, when the airflow distribution is represented by using a two-dimensional distribution graph, only nine projection points of the twenty-seven test points on the xy plane need to be plotted, and a plurality of actual directions and the actual velocities are marked in turn on the nine projection points. The actual directions and the actual velocities of the test points at different heights may be represented by using arrows having different shapes or colors. As shown in FIG. 3, the direction of each arrow identifies the actual direction; the length of each arrow represents the actual velocity; the double-line arrows represent the actual directions and the actual velocities of the nine test points the z coordinate of which is h, the single solid line arrows represent the actual directions and the actual velocities of the nine test points the z coordinate of which is 2h, and the single dotted line arrows represent the actual directions and the actual velocities of the nine test points the z coordinate of which is 3h, thereby the actual direction and the actual velocity of the airflow at each test point can be obtained.

Figure 4:
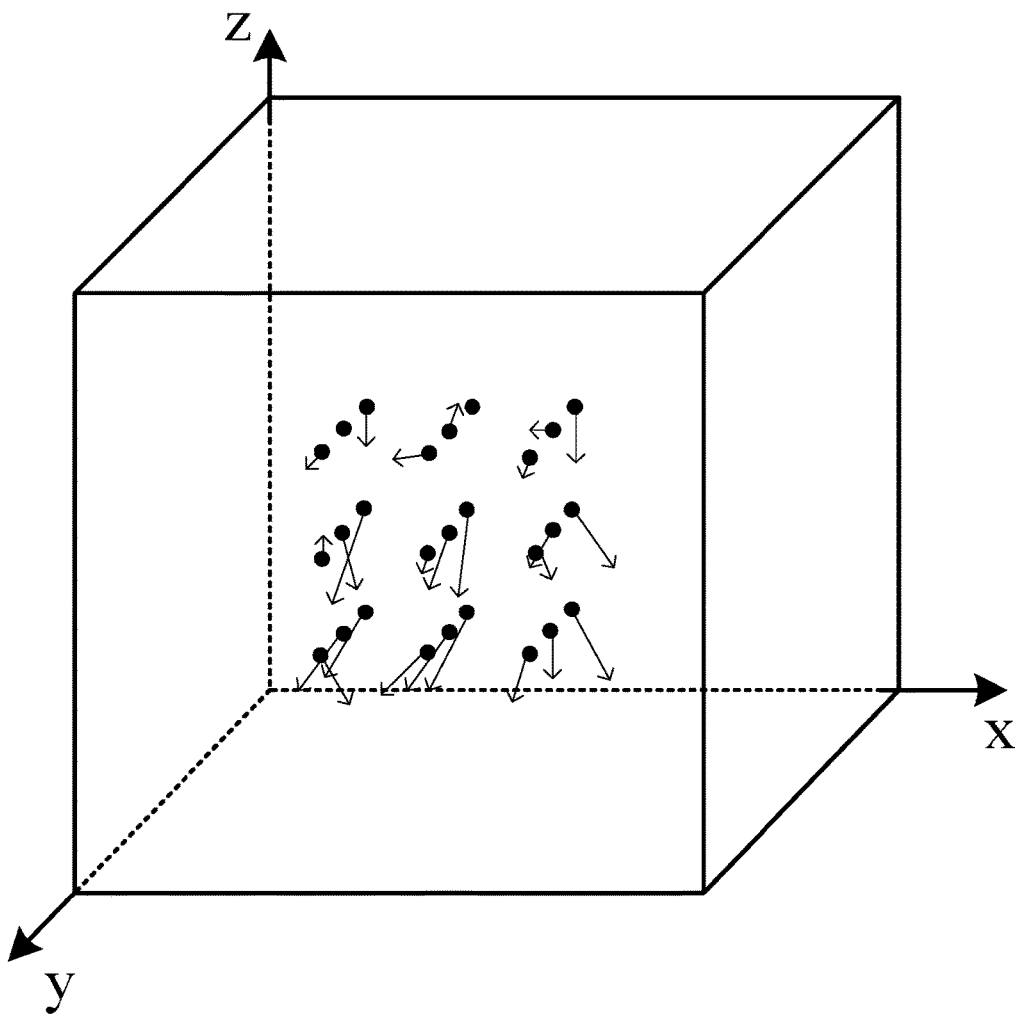
FIG. 4 is a three-dimensional airflow distribution graph according to an embodiment of the present invention.

Alternatively, as shown in FIG. 4, when the airflow distribution is represented by using a three-dimensional distribution graph, the actual direction and the actual velocity of the airflow at each test point can be directly marked on the test point. In FIG. 4, the direction of each arrow represents the actual direction; the length of each arrow represents the actual velocity. Compared to the two-dimensional distribution graph, the three-dimensional distribution graph is more stereoscopic and intuitive.

Figure 5:
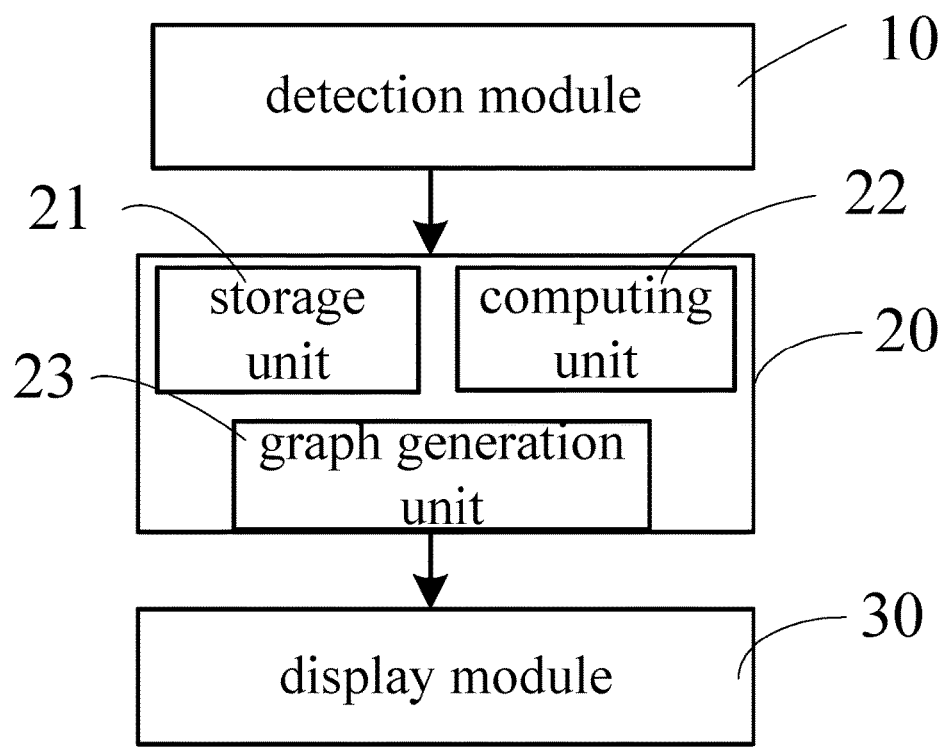
FIG. 5 is a schematic structural view of the airflow test apparatus according to an embodiment of the present invention.

As another aspect of the present invention, an airflow test apparatus is provided, as shown in FIG. 5, the airflow test apparatus comprises:

a detection module 10 for detecting the respective one-dimensional velocities of the airflow at each test point along a plurality of test directions, said plurality of test directions including at least three directions; and a processing module 20 for calculating the actual direction and the actual velocity of the airflow at each test point based on the respective one-dimensional velocities of the airflow at the test point along the plurality of test directions.

Specifically, the detection module 10 may comprise any one of an impeller anemometer, acoustic anemometer or thermal anemometer. The detection module 10 only needs to detect the one-dimensional velocities of the airflow at the test point along the test directions. Such detection can be performed by using anemometer with simple structure, thereby the occupied space can be reduced.

The plurality of test directions is not limited in the embodiments of the present invention. Preferably, the detection module 10 may establish a three-dimensional reference coordinate system in the test space (with arbitrary two coordinate axes perpendicular to each other). The plurality of test directions include the directions of coordinate axes of the three-dimensional reference coordinate system, the processing module 20 comprises:

a storage unit 21, in which a function for calculating the actual direction and the actual velocity of the airflow at each test point is stored in advance; and a computing unit 22, which utilizes the function to calculate firstly the intermediate direction and the intermediate velocity of the airflow at the test point based on the one-dimensional velocities along directions of any two coordinate axes of the three-dimensional reference coordinate system, and then calculate the actual direction and the actual velocity based on the one-dimensional velocity along the direction of the third coordinate axis of the three-dimensional reference coordinate system and the intermediate velocity of the airflow along the intermediate direction.

As discussed above, macro function can be programmed by using computer language and stored in the storage unit 21 as the function. The function utilizes the principle of vector synthesis and synthesizes the one-dimensional velocities along different test directions into the actual velocity on the actual direction.

The computing unit 22 renders the actual direction and the actual velocity in a form of digital table. In order for the operator's observation, the actual direction and the actual velocity can be rendered in a graphic form. Specifically, the detection module 10 can detect the coordinates of the test points; as shown in FIG. 5, the processing module 20 further comprises a graph generation unit 23 which generates an airflow distribution graph according to the coordinate values for the respective test points and the calculation results of the computing unit. The airflow test apparatus further comprises a display module 30 for displaying the airflow distribution graph generated by the graph generation unit.

Specifically, the airflow distribution graph includes:

a two-dimensional distribution graph including projection points of the plurality of test points, wherein each projection point is marked by using a two-dimensional graphic mark of various colors, the two-dimensional graphic marks of a same color are used for the test points having the same height, the two-dimensional graphic mark corresponds to the actual direction and the actual velocity of the airflow at the test point; and/or a three-dimensional distribution graph, wherein each test point is marked by using a three-dimensional graphic mark corresponding to the actual direction and the actual velocity of the airflow.

It is readily understood that the graph generation unit 23 generates the specific graphic information of the airflow distribution graph including the gray scale of pixels, brightness and etc., and the display module 30 shows the airflow distribution graph based on the specific graphic information.

Of course, the plurality of two-dimensional graphic marks at each projection point in the two-dimensional distribution graphic may have same color but different shapes (e.g. lines with different width), so as to distinguish the test points at different heights.

In practice, the processing module 20 may be the CPU of a computer, the display module 30 may be the display device of the computer, a macro function programmed in advance can be stored in the memory of the computer as the function. When the detection module 10 detects the one-dimensional velocities along different test directions, a software having a macro editing function can be opened and the macro function is invoked, by macro editing using the test directions and the one-dimensional velocities as inputs, the actual direction and actual velocity can be obtained. Alternatively, the detection module 10 can be directly connected with the processing module 20, and the detected test directions and the one-dimensional velocities can be input into the processing module 20 directly as input values of macro, thereby an automatic processing is realized.

The airflow test method and the airflow test apparatus of the present invention are described above. According to the present invention, when testing the airflow distribution, only the one-dimensional velocity of the airflow along each test direction need to be detected, then the actual direction and the actual velocity of the airflow at the test point can be obtained by synthesizing the test directions and the corresponding one-dimensional velocities. Compared to the prior art, the present invention provides a simple test method and a simple structure of the apparatus, thereby the occupied test space is reduced, and the test method of the present invention is applicable to small space within a device. Moreover, the test method of the present invention does not require the test gas introduced into the test space, thereby the impact on the temperature and humidity within the test space can be reduced.

As still another aspect of the present invention, a clean room control system is provided comprising above airflow test apparatus and a dust detection apparatus. When the airflow test apparatus detects airflow distribution of clean room, the clean room control system may control the dust detection apparatus through a controller to detect whether dusts exist in the clean room, and the cleanliness level within the device can be improved by changing the distribution status of airflow. For example, when the airflow test apparatus detects that the airflow in the clean room moves from left to right, and the dust detection apparatus detects that dusts are brought by the airflow to be distributed above the work pieces, clean airflow may be introduced from the opening on the right side of the clean room, so as to change the existing airflow status, move the dusts above the work pieces to other places, thereby the contamination during process of work pieces can be reduced.

It could be understood that, the above embodiments are merely exemplary embodiments adopted for describing the principle of the present invention, but the present invention is not limited thereto. Various modifications and improvements may be made by a person skilled in the art without departing from the spirit and essence of the present invention, and these modifications and improvements are considered to be within the protection scope of the present invention.

The invention claimed is:

1. An airflow test method, comprising steps of:
    establishing a three-dimensional reference coordinate system in a test space,
    setting a plurality of test points within the test space;
    detecting respective one-dimensional velocities of the airflow at each test point along a plurality of test directions, said plurality of test directions including directions of coordinate axes of the three-dimensional reference coordinate system; and
    calculating an actual direction and an actual velocity of the airflow at each test point based on the respective one-dimensional velocities of the airflow at the test point along the plurality of test directions.

2. The airflow test method of claim 1, wherein the step of calculating the actual direction and the actual velocity of the airflow at each test point based on the respective one-dimensional velocities of the airflow at the test point along the plurality of test directions includes:
    determining an intermediate direction and an intermediate velocity of the airflow at the test point based on the one-dimensional velocities along directions of any two coordinate axes of the three-dimensional reference coordinate system; and
    calculating the actual direction and the actual velocity of the airflow at the test point based on the one-dimensional velocity along the direction of a third coordinate axis of the three-dimensional reference coordinate system and the intermediate velocity of the airflow along the intermediate direction.

3. The airflow test method of claim 1, wherein after the step of calculating the actual direction and the actual velocity of the airflow at each test point based on the respective one-dimensional velocities of the airflow at the test point along the plurality of test directions, the method further comprises:
    plotting an airflow distribution graph according to the coordinate values for the respective test points and the actual direction and the actual velocity of the airflow at each test point.

4. The airflow test method of claim 3, wherein the airflow distribution graph includes:
    a two-dimensional distribution graph including projection points of the plurality of test points on a same plane, wherein each projection point is marked by using a two-dimensional graphic mark of various colors, the two-dimensional graphic marks of a same color are used for the test points having the same height, the two-dimensional graphic mark corresponds to the actual direction and the actual velocity of the airflow at the test point; and/or a three-dimensional distribution graph including a plurality of test points, wherein each test point is marked by using a three-dimensional graphic mark corresponding to the actual direction and the actual velocity of the airflow.

5. An airflow test apparatus comprising:
a detection module configured for detecting respective one-dimensional velocities of the airflow at each of a plurality of test points in a test space along a plurality of test directions, said plurality of test directions including directions of coordinate axes of a three-dimensional reference coordinate system in the test space; and
a processing module configured for calculating an actual direction and an actual velocity of the airflow at the test point based on the respective one-dimensional velocities of the airflow at each test point along the plurality of test directions.

6. The airflow test apparatus of claim 5, wherein the detection module comprises any one of an impeller anemometer, acoustic anemometer or thermal anemometer.

7. The airflow test apparatus of claim 5, wherein the processing module comprises:
a storage unit, in which a function for calculating the actual direction and the actual velocity of the airflow at each test point based on the respective one-dimensional velocities of the airflow at the test point along the plurality of test directions is stored in advance; and
a computing unit, which utilizes the function to calculate firstly an intermediate direction and an intermediate velocity of the airflow at the test point based on the one-dimensional velocities along directions of any two coordinate axes of the three-dimensional reference coordinate system, and then calculate the actual direction and the actual velocity based on the one-dimensional velocity along the direction of a third coordinate axis of the three-dimensional reference coordinate system and the intermediate velocity of the airflow along the intermediate direction.

8. The airflow test apparatus of claim 7, wherein the detection module is configured for detecting the coordinate values of the test point, and the processing module further comprises a graph generation unit which generates an airflow distribution graph according to the coordinate values for the respective test points and the calculation results of the computing unit; and
the airflow test apparatus further comprises a display module for displaying the airflow distribution graph generated by the graph generation unit.

9. The airflow test apparatus of claim 8, wherein the airflow distribution graph includes:
a two-dimensional distribution graph including projection points of the plurality of test points on a same plane, wherein each projection point is marked by using a two-dimensional graphic mark of various colors, the two-dimensional graphic marks of a same color are used for the test points having the same height, the two-dimensional graphic mark corresponds to the actual direction and the actual velocity of the airflow at the test point; and/or
a three-dimensional distribution graph including a plurality of test points, wherein each test point is marked by using a three-dimensional graphic mark corresponding to the actual direction and the actual velocity of the airflow.

10. A clean room control system comprising the airflow test apparatus of claim 5 and a dust detection apparatus.

* * * * *